Patented July 10, 1928.

1,676,604

UNITED STATES PATENT OFFICE.

CARLETON ELLIS, OF MONTCLAIR, NEW JERSEY.

QUALITY OF SULPHUR.

No Drawing.    Application filed December 26, 1922.    Serial No. 609,133.

This invention relates to sulphur and a method of improving its quality and relates especially to the addition to sulphur of substances or mixtures of substances which dissolve in the sulphur or incorporate with it so readily that the texture, strength and other qualities of the sulphur are more or less modified.

Sulphur has been proposed as a binding agent for sand, asbestos and other so-called fillers in order to mold various articles such as water tanks, storage battery containers and the like. Sulphur is remarkably resistant to water and has useful insulating qualities and other properties which render it of prospective value as a binding agent in various arts. Sulphur however is brittle and to a great extent the brittleness and some of the other properties are dependent upon the degree to which it crystallizes. If the crystalline structure of sulphur when passing from a molten to a solid state can be repressed, materials of greater strength can be obtained. In the present invention it is proposed to incorporate with sulphur small amounts up to large proportions or predominating amounts of substances which are compatible with sulphur assimilating with or dissolving in sulphur as the case may be. The range of substances thus compatible with sulphur is not large but I have found that compounds of sulphur with phenol or phenoloid bodies are capable of dissolving in molten sulphur and considerably modify its texture. When molten sulphur and substances such as various natural resins are heated together, the resinous substance or any possible products of its reaction with the sulphur will separate in the course of time if the sulphur is maintained in a molten state. Such separation is indicative of a lack of compatibility. In the case of the sulphureted phenol resins, used within quite a wide range of proportions, solution takes place and no separation occurs even though the sulphur is maintained at its melting point for a long period.

Resins which thus dissolve in and modify the texture of sulphur may be made by treating ordinary phenol with sulphur chloride. To 1 part of phenol between 1 and 2 parts of sulphur chloride may be added. This may be best carried out in the presence of a solvent such as benzol. Thus one may dissolve one part of phenol in an equal amount of benzol and add 1½ parts of sulphur chloride, sulphur monochloride being used in preference to the dichloride, although mixtures of the two chlorides sometimes may be advantageously utilized. Resins made within this range are soft and yielding and much less brittle than those made from phenol and higher proportions of sulphur chloride. However for the purposes of the present invention 3 parts or more of sulphur chloride may be used to 1 part of phenol. In the case of cresols a lesser amount of sulphur chloride is required to produce a soft plastic resin soluble in sulphur. Better results are obtained by using sulphur chloride in amount at least 1¼ times the amount of phenolic body employed as the greater the degree of sulphureting of the phenol within certain limits at least the solubility in sulphur apparently is improved. Better results are obtained with resins made from sulphur chloride than those made by heating phenol with sulphur and a catalyst such as potassium carbonate. The sulphureted resin obtained in this case has not the solubility characteristic of the sulphur chloride resins.

A composition made by heating turpentine with sulphur for a long period at 170° C., or so, under a reflux condenser, to form a soft black plastic substance, for example a kind on the market known as Toron also may be used (to mix with the molten sulphur) within a certain range of proportions. A more complete description of this material is given in Ellis, Synthetic Resins and Their Plastics, dated 1923, pages 317 and 318. The composition however is not soluble to a large extent in molten sulphur. Hence Toron is less desirable than the sulphurized resins above referred to. Other compounds for example those made by heating cymene with sulphur, crude cymene oils being available for the purpose, may be used.

In addition to the phenolic bodies mentioned other substances such as naphthol and the like may be utilized in some cases to react with sulphur chloride.

It is desirable to choose a resin of a plastic character in order to thereby modify the qualities of the sulphur for molding purposes. If a brittle sulphur resin is chosen the effect on the sulphur in reducing brittleness of the latter may not be pronounced.

Another phase of the invention is that of retaining the plasticity of sulphur or retarding its change from the plastic state. When sulphur is heated somewhat above 160° C. and suddendly cooled it possesses very curious properties (as has been well known for years). It may be drawn out into stringy masses or rolled into sheets because when cold it has a notable degree of plasticity without being especially sticky. In one form of the present invention it is an object to retain this plasticity at least for a considerable period in order to allow so cheap a substance as sulphur to be utilized as a binder and molded into shape while in plastic form. Later if the plasticity is lost to some extent the change takes place after the article is molded and the effect of decrease in plasticity is not so noticeable.

The addition of phenol sulphur chloride resins such as mentioned above serves to retard crystallization over indefinite or prolonged periods. Thus by converting sulphur into the plastic or molten condition and adding the substance which retards conversion to the brittle crystalline state, compositions may be molded in the cold or at slightly elevated temperatures and allowed to set until the article has hardened to a point where it can be used. A moderate amount of the sulphur resin, say 10 to 25 per cent, readily serves in this case, while for retaining the plasticity of sulphur over longer periods larger proportions of the phenol sulphur resins may be employed. In some cases the resin may be present in major proportion.

In one series of experiments sulphur was heated with resin made from phenol 1 part and sulphur monochloride 1½ parts. The mixture was heated to a temperature at which sulphur becomes plastic and then poured into cold water. Various proportions were used.

(A) 25 parts sulphur to 100 parts resin.
(B) 50 parts sulphur to 100 parts resin.
(C) Equal parts sulphur and resin.
(D) 150 parts sulphur to 100 parts resin.
(E) 200 parts sulphur to 100 parts resin.
(F) 300 parts sulphur to 100 parts resin.
(G) 400 parts sulphur to 100 parts resin.

All these mixtures were very plastic for a day or two after being prepared and could be readily shaped to any desired form. Also they could be incorporated with filling agents asbestos, wood flour and the like. All of these mixtures melt at somewhat below the melting point of sulphur, and in the sample containing equal parts of the resin and sulphur, the melting point was about 65° C. The higher proportions of sulphur became hard in the course of a few days and at the end of a week, among the samples containing the higher proportions of sulphur, only that one containing 200 grams sulphur to 100 grams resin was soft. At the end of somewhat over two years these samples have been re-examined and it is observed that the last mentioned sample while hard has the property of becoming plastic when warmed in the hands and kneaded slightly between the fingers. That made from 150 parts sulphur to 100 parts of resin is plastic in this way to a greater degree.

A product of a somewhat different type was made by mixing 50 parts by weight each of plastic sulphur and phenol resin made with sulphur chloride 3 parts to phenol 1 part. 5 parts of asbestos and 10 parts of barytes were added, mixed thoroughly and pressed into the form of a disc. At the end of over two years this disc is hard, firm and fairly strong.

As resin made from phenol and higher proportions of sulphur chloride such as 3 to 3½ parts of sulphur monochloride to 1 part of phenol is quite resistant to acids and as sulphur also has good qualities of resistance, mixtures were made of sulphur and these high sulphur resins for the purpose of producing a resistant binder in making storage battery cases and the like. If incorporated with sand and asbestos (these being non-combustible mineral fillers,) it is possible to obtain a fairly resistant composition.

The invention therefore comprises two forms or phases, one being that of incorporating with sulphur heated to the molten state but not necessarily to the plastic point, of a quantity of compatible or miscible modifying material and the second phase contemplates heating sulphur to the point where it becomes plastic and adding a quantity of compatible or miscible material capable of retarding the conversion of plastic sulphur to an indefinite or controllable degree. Thus compositions can be made for the plastic arts which are capable of setting in a controllable manner by virtue of the slow conversion of the plastic sulphur to the normal or crystalline form.

While as stated phenol, cresol and the like are used to advantage for this purpose and light colored resins may be obtained therefrom by treatment with sulphur chloride which do not materially darken or change the natural color of sulphur, other substances may be used where the discoloration is unimportant. Thus coal tar containing a considerable amount of phenolic bodies may be treated with sulphur chloride to form black resins which are partially soluble in molten sulphur and for cheap compositions where color and quality is of less importance such partially soluble compounds may be employed to assist in maintaining sulphur plastic or to improve the texture of sulphur heated only to its melting point. However for many purposes such compounds are entirely inadequate and the present case therefore stresses the light colored mixtures obtained by incorporated sulphur with the plastic resins yielded by treatment of phenols of goods quality with sulphur chloride and which are readily miscible with molten sulphur.

It is also an inherent characteristic of the modified sulphur compositions disclosed herein, that they are less inflammable than unmodified sulphur.

What I claim is:—

1. A composition comprising sulphur and a sulphur-containing resin miscible therewith.

2. A light colored composition comprising sulphur and at least 10% of a phenol sulphur resin miscible therewith.

3. A composition comprising sulphur and a resin permanently miscible therewith.

4. A composition comprising plastic sulphur and a resinous retarder of transformation of plastic sulphur into crystalline sulphur.

5. A composition comprising plastic sulphur and an organic substance miscible therewith over a range of proportions of at least 2:1 to 1:2, capable of retarding transformation of plastic sulphur to crystalline sulphur.

6. A composition comprising plastic sulphur and a phenol sulphur resin.

7. A composition comprising plastic sulphur and a resinous compound permanently miscible therewith, such composition being stronger and less readily crystallizable than free sulphur.

8. An acid resistant composition comprising plastic sulphur and a smaller proportion of a phenol sulphur resin permanently miscible therewith and resistant to acids.

9. A composition resistant to acids comprising sulphur and a resin formed from phenol and an excess of sulphur chloride.

10. A shaped composition comprising sulphur, and a minor proportion of a resin permanently miscible therewith.

11. A shaped composition comprising 100 parts of sulphur and at least 25 parts of a resin miscible therewith, which resin contains sulphur as a constituent.

12. A molded article comprising as a binder, chemically uncombined sulphur in a substantially non-crystalline state.

13. A material as hereinabove set forth, comprising non-crystalline sulphur, in conjunction with a material capable of maintaining said non-crystalline property for a long period, said material having the general molding and melting properties of sulphur.

14. A composition of matter comprising substantially non-crystalline sulphur and a resin which is capable of acting to retard crystallization of sulphur.

15. A molded article existing at normal room temperature comprising non-crystalline sulphur and a resinous body.

16. A product comprising sulphur and an organic substance miscible with molten sulphur and lowering the melting point thereof such substance acting to retard the crystallization of sulphur, the blended material being less brittle than ordinary crystallized sulphur.

17. A composition of matter comprising free sulphur and a resin capable of readily dissolving therein, over a range of proportions of at least 2:1 to 1:2, at slightly above the melting point of sulphur.

18. A composition of matter comprising sulphur and an organic material which is readily soluble in molten sulphur in such amounts as to at least very substantially delay the crystallization of sulphur in passing from the molten state to the cold state, and to thereby yield upon molding, articles which for a considerable time will have substantially greater tensile strength and toughness than molded pure sulphur articles of similar size and shape.

19. A composition comprising non-crystalline sulphur in conjunction with at least 10% of a material miscible with sulphur when the latter is in the molten state and retarding the conversion of said non-crystalline sulphur to the crystalline form, said composition having many properties similar to those of sulphur and but for said miscible material would return readily to the state of ordinary brittle crystalline sulphur.

20. A composition comprising non-crystalline sulphur in admixture with a sulphur resin miscible with sulphur when the latter is in the molten state and retarding the conversion of said non-crystalline sulphur to the crystalline state, said composition having many properties similar to those of ordinary solid sulphur and but for said miscible resin the non-crystalline sulphur contained therein would return in the normal course to crystalline sulphur.

21. A brittle sulphur-like composition of matter comprising non-crystalline sulphur in conjunction with a material maintaining such sulphur in a non-crystalline state, such composition melting when heated, and being moldable like sulphur, and being of a light color, and non-volatile and substantially stable in the air and insoluble in water.

22. A composition comprising sulphur in conjunction with a material miscible with molten sulphur, up to at least one part of such material to nine parts of molten sulphur, and which material is capable of retarding the crystallization of sulphur when passing from a molten to a solid state, said composition when cooled to solidification, being of about the consistency of solid sulphur but less brittle, and being moldable like sulphur and melting when heated, as does sulphur.

23. A rigid somewhat brittle sulphur-like composition which comprises sulphur and a normally solid substance miscible therewith which acts to retard the crystallization of sulphur when the product cools from the molten state.

CARLETON ELLIS.

CERTIFICATE OF CORRECTION.

Patent No. 1,676,604.      Granted July 10, 1928, to

CARLETON ELLIS.

It is hereby certified that error appears in the above numbered patent requiring correction as follows: In the grant and in the heading to the printed specification, title of invention, for "Quality of Sulphur" read "Improving the Quality of Sulphur"; and that the said Letters Patent should be read with this correction therein that the same may conform to the record of the case in the Patent Office.

Signed and sealed this 25th day of September, A. D. 1928.

(Seal)

M. J. Moore,
Acting Commissioner of Patents.

tarding the crystallization of sulphur when passing from a molten to a solid state, said composition when cooled to solidification, being of about the consistency of solid sulphur but less brittle, and being moldable like sulphur and melting when heated, as does sulphur.

23. A rigid somewhat brittle sulphur-like composition which comprises sulphur and a normally solid substance miscible therewith which acts to retard the crystallization of sulphur when the product cools from the molten state.

CARLETON ELLIS.

CERTIFICATE OF CORRECTION.

Patent No. 1,676,604.  Granted July 10, 1928, to

CARLETON ELLIS.

It is hereby certified that error appears in the above numbered patent requiring correction as follows: In the grant and in the heading to the printed specification, title of invention, for "Quality of Sulphur" read "Improving the Quality of Sulphur"; and that the said Letters Patent should be read with this correction therein that the same may conform to the record of the case in the Patent Office.

Signed and sealed this 25th day of September, A. D. 1928.

(Seal)

M. J. Moore,
Acting Commissioner of Patents.